United States Patent Office 3,201,325
Patented Aug. 17, 1965

3,201,325
PROCESS FOR THE RECOVERY OF
COLLAGENASE
Richard Russell Barton, Elkhart, Ind., assignor to Miles Laboratories, Inc., Elkhart, Ind., a corporation of Indiana
No Drawing. Filed Feb. 15, 1963, Ser. No. 258,900
1 Claim. (Cl. 195—66)

This invention relates to fermentation recovery means. More particularly, it concerns means for recovering proteolytic enzymes from fermentation media.

Heretofore, the art has endeavored to recover the proteolytic enzyme, collagenase, from fermentation media previously inoculated with anaerobic strains of Clostridium, e.g., *Cl. histolyticum* or *Cl. welchii*, by ammonium sulfate precipitation. However, the collagenase so recovered invariably contains undesired amounts of protease and other contaminants. In addition, the recoverable yields have been quite low and the collagenase product discolored.

It is an object of the present invention to provide a recovery process which results in a high percentage of relatively uncontaminated collagenase enzyme.

It is a further object to provide a process for a collagenase enzyme-yielding fermentation wherein undesired proteolytically active impurties have been substantially completely removed.

Other objects and advantages will become apparent from the following description.

It has now been discovered that undesired proteolytically active substances, such as protease, can be substantially completely removed from the fermentation medium of a collagenase-producing fermentation by adsorption means such as ion exchange treatment.

Generally speaking and in its broad form, the present invention contemplates (1) the removal by mechanical means of a major portion of impurities from the solvent medium which has been inoculated with *Cl. histolyticum* or *Cl. welchii* and then incubated and (2) further purifying said solvent medium by adsorption of said remaining impurities by ion exchange means. The collagenase extract thus obtained is then processed by various means comprising (3) dialysis, (4) sterilized filtration and (5) frozen lyophilization. It is during the ion exchange process that most of the undesired proteolytically-active substances formed during the fermentation process are removed.

In accordance with the instant method, after the growth medium is inoculated with the bacterial culture, said medium is held at about 95–100° F. for 18–24 hours under anaerobic conditions by either sealing the fermenter or by flushing said fermenter with sterile nitrogen and then sealing it during fermentation.

In a preferred embodiment the present invention may be effected by centrifugation or by filtration of the resulting fermentation beer through suitable filtering media such as diatomaceous earth or other filter agents. Thus clarified, the supernatant may be placed in contact with ion exchange resins, preferably a phenolic anionic resin containing primary, secondary or tertiary amines as functional groups, although any weakly anionic resin has been found satisfactory. This results in removing chromogens and considerable quantities of various nitrogen containing components such as amino acids and polypeptides. The pH of the resin is equilibrated at about 6.0 to 7.4 by buffers or acids such as phosphate buffer or dilute hydrochloric acid. Following the ion exchange step, dialysis is effected in various ways, such as by placing the resin eluate in cellulose tubing or cellophane and circulating tap water around the tubing or by means of a continuous counter-current flow dialyzer. Any dialyzing method may be employed which will effectively remove undesired salts and nitrogenous compounds in the medium. Subsequently, the thus processed medium may be concentrated, e.g., under vacuum, and finally filtered. The final filtration step removes various bacterial cells and spores, a filter effective to so exclude these substances being used, for example a Millipore filter with pores of 0.22 micron diameter. Finally, the filtrate is dried by lyophilization to produce the desired powdered enzyme.

In practicing this invention, customary procedures of inoculation of the growth medium are employed wherein a selected culture of *Clostridium histolyticum* is used after at least three serial transfers. Vitamin supplements and iron-containing supplement solutions are separately sterilized and added to the sterile medium. These various media, for example, may contain the following:

Growth medium:
Trypticase soy broth _____ g__ 150
Protease peptone _____ g__ 500
$MgSO_4 \cdot 7H_2O$ _____ mg__ 800
$KH_2PO_4$ _____ g__ 12.2
$Na_2HPO_4$ _____ g__ 90
Vitamin supplement solution _____ ml__ 100
Iron supplement solution _____ ml__ 100
Water _____ l__ 10

Vitamin supplement solution:
Calcium pantothenate _____ mg__ 20
Nicotinic acid _____ mg__ 20
Pyridoxine·HCl _____ mg__ 20
Pimelic acid _____ mg__ 20
Thiamine _____ mg__ 20
Riboflavin _____ mg__ 4
Water _____ ml__ 100

Iron supplement solution:
$FeSO_4 \cdot 7H_2O$ _____ mg__ 120
HCl _____ ml__ 1
Water _____ ml__ 100

Further, it was determined by random samplings that the fermentation medium extract contained about 1.0 protease units per ml., and that after ion exchange treatment as described hereinabove, the medium extract contained as little as about 0.08 protease units per ml. By the ion exchange treatment, therefore, up to 92% of the protease is removed, resulting in a more pure collagenase product than has been obtained heretofore.

For the purpose of affording those skilled in the art a better understanding of the invention and a better appreciation of the advantages of the invention, the following illustrative examples are given.

EXAMPLE I.—COLLAGENASE RECOVERY AT
pH 7.4 AFTER 24-HOUR INCUBATION

Seventeen liters of medium, inoculated with *Clostridium histolyticum*, were incubated for 24 hours. This turbid solution was then centrifuged to remove a major portion of the bacteria and any insoluble medium components. This treatment resulted in a clear, dark brown solution containing collagenase which was then run through a weak anion exchange resin (Duolite A-2) in the phosphate form at a pH of 7.4. Duolite A-2 is a phenolic anionic exchange resin containing secondary amine reactive sites which is commercially available from the Chemical Process Company. After this treatment most of the chromogenic agents were removed as indicated by the pale yellow color of the enzyme solution. Following the ion exchange step, the extract was dialyzed through a continuous dialyzer against tap water to remove medium salts and about 18% of the Kjeldahl nitrogen. The extract was then filtered through a sterilizing filter having pores of 0.22 micron diameter to remove any bacteria. The collagenase solution was then dried by lyophilization, and 429 grams of an off-white powder, free of anaerobic bacteria and which assayed 19,000 u./g., were recovered. This represents an overall recovery of 83 percent.

EXAMPLE II.—COLLAGENASE RECOVERY AT pH 7.3 AFTER 18-HOUR INCUBATION

Eighteen liters of medium, inoculated with *Clostridium histolyticum*, were incubated for 18 hours. The resulting turbid solution was then centrifuged to remove a major portion of insoluble medium components and the bulk of the bacteria. This resulted in a clear, dark brown solution containing collagenase which was then run through a weak anion exchange resin (Duolite A-2) in the phosphate form at pH 7.3. The resulting pale yellow color of this enzyme containing solution indicated that it was substantially free of chromogenic substances. The solution was dialyzed against tap water utilizing a continuous dialyzer to remove salts and a portion of the organic components, i.e., Kjeldahl nitrogen. This solution was then rendered bacteria-free by filtration through a sterilizer-filter pad and then dried by lyophilization. From 18 liters of medium, 533 grams of an off-white powder, free of anaerobic bacteria and assaying 22,400 u./g., were recovered. This represented a recovery of 80.5%. The extent of purification obtained in the present example is indicated by the reduction in Kjeldahl nitrogen as shown in Table 1.

*Table 1.—Purification of collagenase extract*

| Treatment of Solution | Mg. N per ml. of Solution | Percent of Original Nitrogen in Solution |
|---|---|---|
| Original extract | 8.15 | 100 |
| After centrifugation | 7.82 | 95.9 |
| After ion exchange | 6.92 | 84.9 |
| After dialysis | 3.77 | 46.3 |

EXAMPLE III.—COLLAGENASE RECOVERY BY SUBSEQUENT EXHAUSTIVE DIALYSIS

This eighteen liter fermentation proceeded in the same manner as described in Example II through the ion exchange step. Then the collagenase extract was exhaustively dialyzed in cellophane tubing for 24 hours against tap water. The enzyme solution was sterilized and dried by lyophilization, and a yield of 330 g. of collagenase, free of anaerobic bacteria and which assayed 17,800 u./g., was recovered. The extent of purification obtained is shown in the following table and represents a reduction in Kjeldahl nitrogen.

*Table 2.—Purification of collagenase solution*

| Treatment of Solution | Mg. N per ml. of Solution | Percent Original Nitrogen in Solution |
|---|---|---|
| Original extract | 7.91 | 100 |
| After ion exchange | 5.62 | 71.0 |
| After dialysis | 2.52 | 31.8 |
| After sterilizing filtration | 2.08 | 26.3 |

EXAMPLE IV.—COLLAGENASE RECOVERY

This fermentation was handled in the same manner as described in Example III. After drying, a yield of 14.5 g. of dry collagenase per liter of fermentation medium was obtained. This off-white powder, free of anaerobic bacteria, assayed 24,000 u./g. This amounted to 96.8% overall recovery. The purification of the collagenase solution is shown in Table 3.

*Table 3.—Purification of collagenase extract*

| Treatment of Solution | Mg. N per ml. of Solution | Percent Original Nitrogen in Solution |
|---|---|---|
| Original extract | 8.38 | 100 |
| After centrifugation | 7.74 | 92.3 |
| After ion exchange | 5.28 | 63.1 |
| After dialysis | 1.60 | 19.1 |
| After sterilizing filtration | 1.53 | 18.3 |

In summary therefore, the present invention relates to the recovery of collagenase enzymes from fermentation media previously inoculated with anaerobic strains of *Clostridium histolyticum* or *Clostridium welchii* whereby undesired proteolytically-active impurities have been substantially completely removed.

What is claimed is:

A process for recovering a relatively uncontaminated collagenase product from a fermentation medium containing collagenase and other proteolytic enzymes, said collagenase being produced by fermentation of a growth medium with an anaerobic bacterial strain of *Clostridium histolyticum*, said process consisting essentially of passing said fermentation medium through a phenolic anionic exchange resin containing secondary amine reactive sites, said resin having been previously adjusted to a pH within a range of from about 6.0 to 7.4, wherein said resin adsorbs a substantial portion of said other proteolytic enzymes and said collagenase passes through said resin and is recovered as a relatively uncontaminated product.

References Cited by the Examiner

Grant et al., Archives of Biochemistry and Biophysics, 82, 242–255 (1959).

Mandl, article entitled, "Collagenases and Elastases," in Advances in Enzymology, 23, 163–264, pp. 189 and 260 relied on, 1961.

Dirks et al., Cereal Chemistry, 26, 98–109 (1949).

Vlasova et al., Vopr., Med. Khim., 8, 424–428 (1962) Moscow; abstracted C.A. 58.

A. LOUIS MONACELL, *Primary Examiner.*

NORMAN G. TORCHIN, *Examiner.*